P. W. BLAKE.
ADHESIVE SUBSTANCE AND METHOD OF PREPARING THE SAME.
APPLICATION FILED NOV. 28, 1908.
969,449.  Patented Sept. 6, 1910.
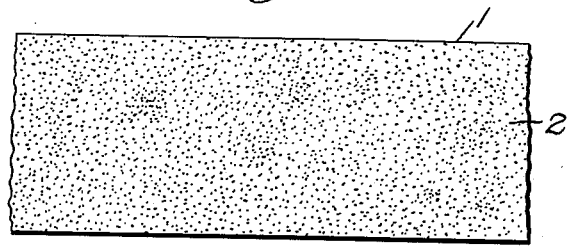
Witnesses:
Horace H. Crossman
Robert H. Kammler
Inventor:
Philip W. Blake.
by Emery and Booth
Attys.

UNITED STATES PATENT OFFICE.

PHILIP W. BLAKE, OF BOSTON, MASSACHUSETTS, ASSIGNOR TO FREDERICK S. ANABLE, OF BOSTON, MASSACHUSETTS.

ADHESIVE SUBSTANCE AND METHOD OF PREPARING THE SAME.

969,449.  Specification of Letters Patent.  Patented Sept. 6, 1910.

Application filed November 28, 1908. Serial No. 464,919.

*To all whom it may concern:*

Be it known that I, PHILIP W. BLAKE, a citizen of the United States, residing at Boston, county of Suffolk, and State of Massachusetts, have invented an Improvement in Adhesive Substances and Methods of Preparing the Same, of which the following description, in connection with the accompanying drawings, is a specification, like letters on the drawings representing like parts.

This invention relates to adhesive mediums and the method of preparing the same.

The joining of plain surfaced materials to glossy surfaces or the joining together of two glossy surfaces by the use of the usual adhesive mediums, such as glue, gums, dextrins, paste and the like, whether the gloss has been obtained by polish, coating or otherwise and whether necessarily incident to the process of manufacture for commercial use or inherent in the substance itself, or is the result of some other substance coated upon the same, has always been difficult on account of the fact that such glossy surfaces afford insufficient hold for the adhesive medium. This renders adhesion by such means imperfect at best, even when such adhesive mediums are in a moist state and results often in the complete separation of such surfaces when the moisture has dried out of the adhesive medium. Among these glossy surfaces to which this difficulty of adhesion applied may be mentioned glazed, parafined or waxed paper or the like and varnish or japanned or similarly coated surfaces.

To accomplish the perfect and permanent adhesion of such surfaces without the use of chemicals which may injuriously affect the materials to be joined, whether metals, cloths, papers, leathers, glass or other substances, and by the use of the ordinary adhesive mediums is the object of my invention. I accomplish this result by distributing or enveloping in the adhesive medium finely divided solid particles of matter capable of piercing the surface to which the adhesive medium is to be applied in use. It is apparent that the adhesive medium may be employed in any case where two substances are to be united. For example, the adhesive medium containing the finely divided particles of matter may be painted upon or otherwise applied to one or both of the surfaces that are to be united with a brush or the like and the surfaces then brought together while the adhesive medium is still in a partially liquid condition, or if desired I may coat a strip, sheet or label of paper, cloth or other suitable material with the adhesive medium containing the finely divided particles of solid matter and permit the coating to dry, thereafter moistening it for use. I have in practice prepared strip rolls having one or both surfaces coated with an adhesive medium containing coated particles of matter.

In order that the principles of my invention may be readily understood, I have represented one manner of utilizing or carrying out the invention in the accompanying drawing, wherein—

Figure 1 represents a strip of material coated with an adhesive medium prepared in accordance with my invention; Fig. 2 is a section of the strip shown in Fig. 1, but upon an enlarged scale; Fig. 3 represents in cross section and somewhat diagrammatically the manner in which the strip shown in Fig. 1 is applied to material having a coated surface; and Fig. 4 is a similar representation of the manner of applying an adhesive strip or the like to a non-coated surface.

In preparing the adhesive medium, I preferably employ glue, but any suitable medium may be used, such as dextrin, gum, paste or cement. In any suitable manner, I distribute through the adhesive medium finely divided particles of solid matter, as for example sand preferably having sharp edges or angles, emery, carborundum, finely comminuted glass or the like. Fine particles of sand have been effectively used for the purpose and this substance is desirable because of its cheapness. The adhesive medium having enveloped therein the particles of matter, may be applied, as by a brush, to one or both surfaces that are to be joined together and the surfaces superposed one upon the other while the adhesive medium remains partially liquid, or the adhesive medium having enveloped therein sand or the like may be applied to a strip, sheet or label upon one or both faces dependent upon the use and permitted to dry thereon.

In Figs. 1 and 2, I have represented at 1 a portion of a strip having applied thereto an adhesive medium 2 in which are enveloped suitable particles 3, the number of which in use depends upon the nature of the surfaces to be acted upon. As shown more clearly in Fig. 2, each of the particles is wholly coated with the adhesive medium so as preferably to have no exposed or bare portions.

Many receptacles, such for example as paper boxes, are composed of a base portion of card board or the like to which is applied an exceedingly thin glazed paper. A strip or sheet coated with glue or other adhesive medium in the ordinary manner can not be made permanently to adhere to many of such glazed surfaces. The same is true of varnished, japanned and certain other coated surfaces. If, however, the strip coated with the adhesive medium having enveloped therein sand or other suitable particles be applied to the glazed surface, the sand or other particles impress themselves into and in certain instances pierce the glazed or other surface so as wholly or partially to penetrate the same. Preferably the finely divided particles penetrate the glazed surface into the card board or other base, carrying with them their coating of glue or other adhesive medium which is permitted to contact with and to adhere to such base portion. Preferably in use the strip containing the adhesive medium thus prepared should be pressed by hand or otherwise into such contact with the glazed or similar surface that the adhesive medium between the particles of sand or the like actually contacts with the glazed surface while the coated particles of sand or the like penetrate such glazed surface. If suitable pressure be applied, the adhesive medium surrounding the piercing particles penetrates or is forced into suitable binding relation with the base.

In Fig. 3, I have represented a strip 1 prepared as described and secured as stated to a substance composed of a base portion of card board or the like coated as represented at 5 with a glazed paper. As there represented the glazed paper is punctured by the sand or other suitable finely divided particles which penetrate into the card board 4, carrying with them sufficient of the adhesive medium to cause adhesion.

In Fig. 4, I have represented a substance 6 which may be metal or some other material to which an adhesive medium does not readily adhere. The surface of the material 6 is roughened or penetrated by the coated particles of sand or the like, the adhesive medium being applied in such intimate relation thereto as to cause the strip to adhere firmly thereto.

In preparing the strip or sheet or in using the adhesive medium, it is not necessary that all of the sand or other solid particles be coated with the said medium, and it may in practice be sufficient (dependent upon the nature of the particular article to which the adhesive is to be applied) to apply adhesive medium to the protruding portions of certain only of the said particles and not to the entire number thereof. The number of particles to the protruding portion of which adhesive medium is applied should, of course, be sufficient to accomplish the object of my invention; that is, to convey through the pierced surface by means of said particles a sufficient quantity of the adhesive medium.

From the foregoing description, it will be apparent that an adhesive medium prepared or treated in accordance with my invention may be effectively employed to join together two glossy surfaces, which otherwise could not be joined together permanently or only with extreme difficulty, and that it may be employed to join a plain surfaced material to a glossy surface, whether as a sheet, strip or label or in any other desired manner.

Having thus described one type or embodiment of my invention, I desire it to be understood that although specific terms are employed, they are used in a generic and descriptive sense and not for purposes of limitation, the scope of the invention being set forth in the following claims.

Claims.

1. As an article of manufacture, a sheet or strip having applied thereto, an adhesive medium containing surface impressing particles protruding beyond the general level of said applied medium, said particles being provided with an adhesive medium upon their protruding portions.

2. As an article of manufacture, a sheet or strip having applied thereto an adhesive medium containing surface impressing particles, said particles having a coating of said medium upon that portion of their bodies protruding beyond the general level of the adhesive medium.

3. As an article of manufacture a sheet or strip having applied thereto a layer of glue having particles of sand embedded therein and protruding beyond the general level of said layer, said sand particles being provided with a glue coating upon their protruding portions.

4. That method of preparing an adhesive medium which consists in enveloping therein and coating therewith, finely divided solid particles of matter capable of piercing the strips to which the adhesive medium is to be applied in use, whereby the coating medium is thereby conveyed through said pierced surface and into the substance therebeyond.

5. The method of uniting two surfaces which consists in interposing between them an adhesive medium containing surface-piercing particles serving to penetrate at least one of said surfaces, thereby conveying said adhesive through said surface or surfaces and introducing it into the substance of one or both of the materials whose surfaces are to be united.

6. As a composition of matter, a fluent adhesive medium containing solid particles coated therewith, said particles being capable of piercing the surface to which said medium is to be applied and of conveying portions of said medium through said pierced surface.

7. That method of uniting two surfaces which consists in interposing between them an adhesive medium containing surface impressing particles protruding beyond the general level of the adhesive medium, whereby one at least of said surfaces is impressed by said protruding particles, an adhesive medium extending from the general level thereof, and onto protruding portions of said particles, is positioned in said impressions, beyond the general level of said adhesive medium, and beyond the general surface level of the surfaces united.

In testimony whereof, I have signed my name to this specification, in the presence of two subscribing witnesses.

PHILIP W. BLAKE.

Witnesses:
M. H. LOWRY,
ROBERT H. KAMMLER.